US010817967B2

(12) United States Patent
Chabanne et al.

(10) Patent No.: US 10,817,967 B2
(45) Date of Patent: Oct. 27, 2020

(54) METHOD FOR CONTROLLING THE IDENTITY OF A USER BY MEANS OF A BLOCKCHAIN

(71) Applicant: Idemia Identity & Security France, Issy-les-Moulineaux (FR)

(72) Inventors: Herve Chabanne, Issy-les-Moulineaux (FR); Thomas Chenevier, Issy-les-Moulineaux (FR); Laurent Lambert, Issy-les-Moulineaux (FR); Olivier Clemot, Issy-les-Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 369 days.

(21) Appl. No.: 15/798,153

(22) Filed: Oct. 30, 2017

(65) Prior Publication Data
US 2018/0122031 A1 May 3, 2018

(30) Foreign Application Priority Data

Oct. 31, 2016 (FR) ........................................ 1660566
Mar. 30, 2017 (FR) ........................................ 1752724

(51) Int. Cl.
*H04L 29/06* (2006.01)
*G06Q 50/26* (2012.01)
(Continued)

(52) U.S. Cl.
CPC ....... *G06Q 50/265* (2013.01); *G06Q 20/0655* (2013.01); *H04L 9/0643* (2013.01);
(Continued)

(58) Field of Classification Search
CPC .............. G06Q 50/265; G06Q 20/0655; H04L 9/0643; H04L 9/0869; H04L 9/3066;
(Continued)

(56) References Cited

U.S. PATENT DOCUMENTS

2013/0226792 A1* 8/2013 Kushevsky ............ G06Q 20/36
705/41
2014/0282972 A1* 9/2014 Fan ......................... H04L 63/10
726/7
(Continued)

FOREIGN PATENT DOCUMENTS

WO 2016/128906 A1 8/2016

OTHER PUBLICATIONS

Peters, "Understanding Modern Banking Ledgers through Blockchain Technologies: Future of Transaction Processing and Smart Contracts on the Internet of Money", Nov. 19, 2015, UCL, Department of Computer Science, pp. 1-32 (Year: 2015).*
(Continued)

*Primary Examiner* — Alexander Lagor
*Assistant Examiner* — Gregory A Lane
(74) *Attorney, Agent, or Firm* — Womble Bond Dickinson (US) LLP

(57) ABSTRACT

The present invention relates to a method for controlling the identity of a user (U), comprising the following steps implemented by an identity-controlling device (3):
reading, in a public database (4), confidentiality-protected data if any previously generated by an identity-attesting device (1) from an identity element of a user (U) and at least one random datum specific to the user (U);
verifying (120) heed of a condition relating to the confidentiality-protected data found in the public database (4);
performing predetermined processing for the user (U) only if the condition is heeded.
The public database is of blockchain type and the confidentiality-protected data generated by the identity-attesting device (1) are associated in the public database (4) with first
(Continued)

transaction data indicating that the identity-attesting device (1) has transferred a predetermined amount of electronic currency to a recipient.

16 Claims, 2 Drawing Sheets

(51) Int. Cl.
  *H04L 9/32* (2006.01)
  *H04W 12/06* (2009.01)
  *H04W 12/08* (2009.01)
  *G06Q 20/06* (2012.01)
  *H04L 9/06* (2006.01)
  *H04L 9/08* (2006.01)
  *H04L 9/30* (2006.01)
  *G06F 21/62* (2013.01)

(52) U.S. Cl.
  CPC .......... *H04L 9/0869* (2013.01); *H04L 9/3066* (2013.01); *H04L 9/32* (2013.01); *H04L 63/08* (2013.01); *H04L 63/10* (2013.01); *H04W 12/0602* (2019.01); *H04W 12/0802* (2019.01); *G06F 21/6245* (2013.01)

(58) Field of Classification Search
  CPC .......... H04L 9/32; H04L 63/08; H04L 63/10; H04W 12/06; H04W 12/08
  USPC .......................................................... 713/168
  See application file for complete search history.

(56) References Cited

U.S. PATENT DOCUMENTS

| | | |
|---|---|---|
| 2016/0105414 A1 | 4/2016 | Bringer et al. |
| 2016/0134593 A1* | 5/2016 | Gvili ................... H04L 63/0428 713/170 |
| 2019/0005470 A1* | 1/2019 | Uhr ....................... H04L 9/3265 |

OTHER PUBLICATIONS

Preliminary Research Report received for French Application No. 1660566, dated Jul. 4, 2017, 4 pages (1 page of French Translation Cover Sheet and 3 page of original document).

Chaum et al., "Cryptographically Strong Undeniable Signatures, Unconditionally Secure for the Signer", Advances in Cryptology—CRYPTO '91, CRYPTO 1991, Lecture Notes in Computer Science, vol. 576, 1991, 16 pages.

* cited by examiner

METHOD FOR CONTROLLING THE IDENTITY OF A USER BY MEANS OF A BLOCKCHAIN

FIELD OF THE INVENTION

The present invention relates to a method for controlling the identity of a user.

STATE OF THE ART

In recent years databases known as "blockchains" have emerged.

A database of blockchain type is distributed among several storage nodes of a network. The storage nodes are configured to validate data written in the databases, by implementing a consensus search method between the storage nodes. Said method, for example, is the method known as "proof of work". The content of the database is therefore protected against falsifications despite its distributed nature.

The most famous database of "blockchain" type is the one used in the electronic currency transaction system Bitcoin. The database of the Bitcoin® system contains a ledger of all past transactions made between user accounts of the system. The need to have recourse to a centralised entity such as a bank to authenticate transactions is therefore eliminated.

However, it has been proposed to use a database of blockchain type for purposes other than mere transactions of electronic currency.

In particular, the MIT (Massachusetts Institute of Technology) has proposed the use of the database of blockchain type of the Bitcoin® system to prove that a person is the holder of a MIT diploma.

For this purpose, a MIT server generates a MIT electronic diploma from at least one identity element of a person, for example the person's name, forename and date of birth.

In the public database of the Bitcoin® system, transaction data are memorised indicating that the MIT has transferred a certain number of Bitcoins to that person. The transaction data further comprise a hash of the electronic diploma to indicate that said transaction represents the granting of a MIT diploma to this person. The processing to allow generation of the hash of the MIT diploma from the identity element is made available to the public.

To verify whether a given person has indeed been granted a MIT diploma, a potential employer uses this processing to generate a hash of a presented electronic diploma and verifies in the database of the Bitcoin® system whether there is a hash of an electronic diploma that is not only contained in a MIT transaction but is also identical to the electronic diploma generated and presented by the third party. If positive, the candidate has indeed graduated from the MIT, but otherwise it is not the case.

For example, the processing under consideration—as input—may use the or each identity element in the form of respective chains of characters. The processing performed here in paperless manner corresponds to the filling of personalised fields in a generic diploma model.

Evidently, diploma holders spontaneously give their identity element to the employer, to enable the above-described verification.

However, some third parties may reach the conclusion that the person under consideration is indeed the holder of a MIT diploma, without the authorisation of such person. Knowledge of the person is likely to give rise to knowledge of the identity elements concerning this person (at least first and last name). This knowledge may be used to implement the same steps as those carried out by the employer: using the processing made available to the public to generate a hash of a presented electronic diploma, and searching to determine whether the hash is contained in a MIT transaction.

This raises a problem of privacy-related confidentiality, since it is fully possible that a MIT graduate may not at all wish that anyone may have access to such private information.

SUMMARY OF THE INVENTION

It is one objective of the invention to control the identity of a user by means of a blockchain whilst solving the problem of confidentiality encountered with the solution proposed by the MIT.

Therefore, in a first aspect of the invention there is proposed a method for controlling the identity of a user, comprising the following steps implemented by an identity-controlling device:

reading, in a public database of blockchain type, confidentiality-protected data if any previously generated by an identity-attesting device from an identity element of a user and at least one random datum specific to the user, the confidentiality-protected data generated by the identity-attesting device being associated in the public database with first transaction data indicating that the identity-attesting device has transferred a predetermined amount of electronic currency to a recipient;

verifying heed of a condition relating to the confidentiality-protected data found in the public database;

performing predetermined processing for the user only if the condition is heeded.

Since the database used is public, the confidentiality-protected data may be read by any third party. However, the confidentiality-protected data are dependent not only on at least one identity element of a user but also on the random datum.

A third party knowing the user does not have any knowledge of whether the predetermined processing has or has not been performed. Even if this third party has knowledge of the identity elements of the user used by the identity-attesting device to generate the confidentiality-protected data, such third party also needs to know the random datum.

One advantage of the invention is its ease of implementation. The invention may easily be grafted onto a blockchain of an electronic currency management system already deployed, and for which the security level is proven, such as Bitcoin®.

This grafting is materialised, in said pre-existing blockchain, by the association of confidentiality-protected data with transaction data indicating that the identity-attesting device has transferred a predetermined amount of electronic currency to a recipient. This association, easy to implement, has the effect of guaranteeing that the data have been protected by the identity-attesting device and not by another device.

In other words, the invention allows controlling of the identity of a user via a method that may easily be implemented on an existing blockchain, whilst benefiting from the technical advantages inherent in this type of database (high level of protection against falsifications, decentralisation).

In a first aspect, the method of the invention may further comprise the following features taken alone or in combination whenever technically possible.

In one embodiment, the method in a first aspect may comprise steps of:

obtaining, by the identity-controlling device, second confidentiality-protected data dependent on the identity element and on the random datum, wherein the second confidentiality-protected data are received from a client device belonging to the user, or are generated by the identity-controlling device from the identity element and the random datum;

performing the predetermined processing only if the identity-controlling device finds confidentiality-protected data in the public database that are both generated by the identity-attesting device and are also the same as the second confidentiality-protected data obtained.

In another embodiment, the method according to the first aspect may comprise steps of:

obtaining proof data, by the identity-controlling device, the proof data having been previously generated by a client device belonging to the user from the identity element of the user and the random datum specific to the user;

performing the predetermined processing only if the found confidentiality-protected data and the proof data are related by a predetermined mathematical relation.

The proof data may be received by the identity-controlling device via a secure channel set up directly between the client device and the identity-controlling device.

Alternatively:

the proof data are obtained by reading the proof data in the public database;

the predetermined processing is performed only if the following conditions are met:

the read proof data are associated, in the public database, with the confidentiality-protected data previously generated by the identity-attesting device, the found confidentiality-protected data and the proof data associated with the found confidentiality-protected data are related by a predetermined mathematical relation.

The confidentiality-protected data may have been generated by applying a predetermined hash function H to data $x_0, \ldots, x_n$, where:

n is an integer equal to or higher than 2;

at least one of $x_i$ is a random datum specific to the user, and each other $x_i$ is an identity element of the user, and wherein the proof data comprise:

a datum c calculated by the formula: $c=h(H(A_0, \ldots, A_n))$ where h is a predetermined function, and $A_0, \ldots, A_n$ are n randomly drawn data, n proof data $f_0, \ldots, f_n$ calculated by applying formulas:

$$\forall i \in [\![ 0, n ]\!] \; f_i = A_i + c x_i$$

in which case the predetermined mathematical relationship may be the following:

$$h\left(\frac{H(f_0, \ldots, f_n)}{(H(x_0, \ldots, x_n))^c}\right) = c$$

The recipient may be the user. In this case, the proof data may be associated in the public database with second transaction data indicating that the user has transferred to the identity-controlling device the predetermined amount received from the identity-attesting device.

The predetermined processing may be, may comprise or may trigger a predetermined service to be provided to the user, the method also comprising generation and memorisation in the public database of confirmation data indicating that the service has been provided to the user.

The generated confirmation data may be associated in the public database with third transaction data indicating that a service-providing device, having provided the service to the user, has transferred the predetermined amount to the identity-attesting device.

The method according to the first aspect may further comprise steps of:

after the predetermined processing has been performed by the identity-controlling device, generation by the identity-attesting device of new confidentiality-protected data from the identity element of the user and at least one new random datum specific to the user;

memorisation of the new confidentiality-protected data in the public database so that new implementation of the verification step uses the new confidentiality-protected data instead of the confidentiality-protected data.

The generation of confidentiality-protected data may comprise cryptographic hashing applied to the identity element and to the random datum.

The confidentiality-protected data may be obtained by applying the formula:

$$\prod_{i=0}^{n} G_i^{x_i}$$

where:

n is an integer equal to or higher than 2;

at least one of $x_i$ is a random datum specific to the user, and each other $x_i$ is an identity element of the user;

$G_i$ are predetermined elements of a finite group, for example points on an elliptical curve or elements of a cyclic group.

The confidentiality-protected data may be digitally signed by means of a private key specific to the identity-attesting device, before memorisation thereof in the public database.

The method may further comprise steps of:

electronic signing of the proof data by means of a private key specific to the user, before memorisation thereof in the public database;

gaining access to proof of service data, by the identity-controlling device, by decrypting signed proof data memorised in the public database, by means of a public key specific to the user.

The predetermined processing may be performed by the identity-controlling device only if the identity-controlling device does not find revocation data in the public database indicating that the private key of the user has been revoked by the identity-attesting device.

There is further proposed, in a second aspect of the invention, a computer programme product comprising programme code instructions to execute the steps of the method according to the first aspect of the invention, when this programme is executed by at least one processor.

In a third aspect there is also proposed an identity-controlling device to control the identity of a user, the identity-controlling device comprising a communication interface with a public database and at least one processor configured to:

give instruction for the reading in the public database of the confidentiality-protected data, if any, previously generated by an identity-attesting device from an identity element of the user and at least one random datum specific to the user;

verify heed of a condition relating to the found confidentiality-protected data;

perform predetermined processing for the user only if the condition is heeded.

In a fourth aspect of the invention there is also proposed a system comprising:

an identity-controlling device according to the third aspect of the invention;

an identity-attesting device configured to generate the confidentiality-protected data and to give instruction for memorisation of the confidentiality-protected data in the public database.

In a fifth aspect of the invention there is also proposed a client device intended to belong to a user, the client device comprising a communication interface with a public database, and at least one processor configured to:

generate proof data from an identity element of the user and at least one random datum specific to the user;

give instruction for memorisation, in a public database, of the proof data so as to indicate that the proof data were generated by the client device, and in association with confidentiality-protected data previously generated by an identity-attesting device from one same identity element and one same random datum;

perform the predetermined processing only if the found confidentiality-protected data and the proof data are related by a predetermined mathematical relation.

DESCRIPTION OF THE FIGURES

Other features, objectives and advantages of the invention will become apparent from the following description that is solely illustrative and nonlimiting, and is to be read with reference to the appended drawings in which.

In all the Figures, similar elements carry the same references.

DETAILED DESCRIPTION OF THE INVENTION

Service-Providing System as a Function of an Identity Element

Figure 1:
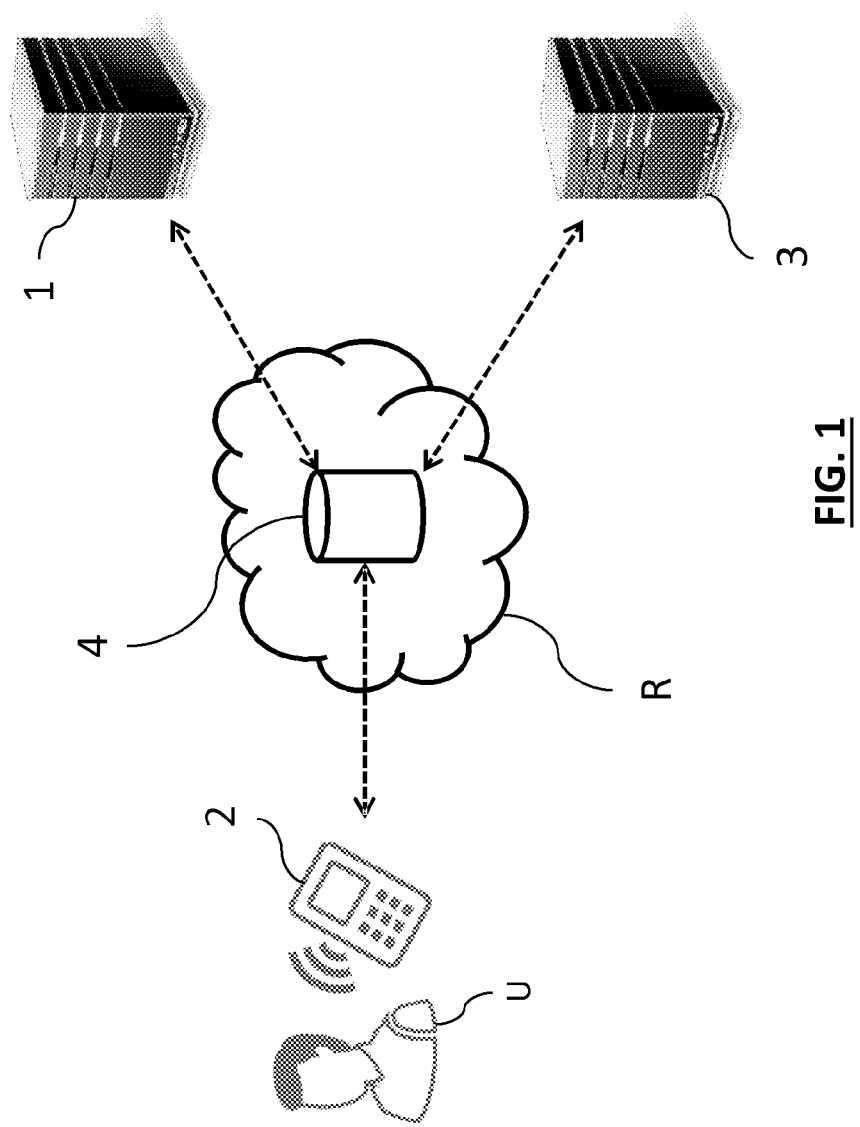
FIG. 1 schematically illustrates a service-providing system according to one embodiment.

With reference to FIG. 1, a service-providing system comprises an identity-attesting device 1, a client device 2 and an identity-controlling device 3.

The three devices 1, 2, 3 communicate together via at least one network R, for example the Internet network, a cell network or combination of said networks.

The three devices 1, 2, 3 each have read and write access to a database 4 stored in the network R.

The database 4 is public in the sense that it may be read accessed not only by the devices 1, 2, 3 in presence, but also by any other third-party device. Any third-party device may in particular consult the data written by one of the devices 1, 2, 3.

Therefore, the identity-attesting device 1 has a read and write access account in the database 4. For this purpose, the identity-attesting device 1 memorises two mutually associated keys: a private signature key specific to device 1 and a public signature verification key also specific to device 1. The private key enables the device 1 to write signed data in the database; it is intended not to be communicated to third parties. The public key enables the device 1 (and any other holder of an access account to the database 4) to verify that a datum contained in the database 4 was written therein by device 1.

The identity-controlling device 3 also has a read and write access account in the database 4. Similar to the identity-attesting device 1, the identity-controlling device 3 memorises a public key and a private key that are mutually associated and specific thereto.

The database 4 is distributed or decentralised in the network R, i.e. it is stored by a plurality of nodes of the network R with which the devices 1, 2, 3 are able to communicate.

The database 4 is a database of "blockchain" type. Herein a database of blockchain type is defined as a database memorised by a plurality of storage nodes configured to validate data written in the database through the implementation of a consensus search method between the storage nodes. Said method is the known "proof of work" method for example. The content of the database 4 is thereby protected against falsifications in spite of its distributed/decentralised nature.

In the remainder hereof, the example will be used of a database 4 conforming to the database used by the Bitcoin® transaction system. Therefore, data may be memorised in the database 4 that represent a transaction of a certain Bitcoin amount between one of the devices 1, 2, 3 and another of these devices 1, 2, 3.

Each of the three devices 1, 2, 3 comprises at least one processor configured to compute data, and a communication interface to communicate with the other devices and with the database 4.

The main function ensured by the identity-attesting device 1 is to attest the authorised or non-authorised character of a user. The identity-attesting device 1 could therefore be used in France by the French national secure credentials agency (Agence Nationale des Titres Securises—ANTS) or by the Imprimerie Nationale, the objective of these bodies being to meet said need. However, the device 1 could be managed by a private company, for example an airline company (this example being developed below).

The main function of the identity-controlling device 3, as its name indicates, is to control the identity of a user.

The identity-controlling device 3 is configured to carry out or not to carry out predetermined processing on behalf of a user, as a function of the result of the identity control it performed on this user.

For example, the control device is configured to provide a predetermined service to a user authorised by the device 1. In this case, the predetermined processing that is or is not performed depending on the result of an identity control of a user, is the providing or non-providing of this service to this user. For example, the identity-controlling device 3 is a device managing the accounts of travellers of the above-mentioned airline company. This device 3 is then adapted for example to allocate or withdraw travel points for a given traveller, and to allocate travel advantages to this traveller.

Alternatively, the identity-controlling device 3 is adapted to communicate with a separate service-providing device. In this case, the predetermined processing may comprise the sending to the service-providing device of a message indicating whether a user just controlled by the identity-controlling device has or does not have the right to receive the service provided by the service-providing device.

The predetermined processing may alternatively, or in addition, comprise an increase in the level of repute of a user authorised by the identity-attesting device 1, with a third-party body. This notion of repute is used for example by banks or insurers to evaluate the profile of their clients. This increase may typically be obtained by incrementing a datum representing a level of repute, implemented by the identity-controlling device 3 and/or by the service-providing device.

The client device 2 is a device intended to be operated by a user U who may request the providing of a service by the identity-controlling device 3. The client device 2 is a smartphone for example or laptop computer.

Service-Providing Method as a Function of the Identity of a User

In the remainder hereof, it is considered in nonlimiting fashion that the identity-controlling device 3 is able to provide a service to an authorised user (in other words it is a service-providing device).

It is further assumed in the remainder hereof that a management application is memorised by the client device 2, configured to set up a communication channel with device 1 and a communication channel with device 3 (for example via the network R). Said application may be downloaded on the initiative of the user U.

The two communication channels are independent of the database 4, i.e. data or messages transiting via any of these channels are not written in the database 4.

At enrolment step 100, the user is enrolled with the identity-attesting device 1.

According to a first variant of the enrolment step 100, the user U contacts an office of the airline company and orally provides at least one personal identity element.

According to a second variant of the enrolment step 100, the application displays a message on a screen of the client device 2 prompting the user U to enter at least one personal identity element. The or each identity element entered by the user U into his client device 2 is transmitted to the identity-attesting device 1 via the communication channel set up by the application between the two devices 1 and 2.

One or more identity elements of the user U may therefore be given to the identity-attesting device 1.

An identity element of a user U may be a civil status element of the user U (last name, first name, date of birth, place of birth, etc.). An identity element may also be information indicating whether the user is or is not of age. An identity element may more generally be any personal information of the user U (for example passport number, identity card number, etc.).

It will easily be understood that an identity element carries some amount of information. Thereupon it become possible to define sets of identity elements to be processed, these being associated with respective levels of confidentiality:
  level 1 identity elements: whether or not the user is of age;
  level 2 identity elements: level 1 identity elements+name of user U;
  level 3 identity elements: level 2 identity elements+ address of user U.

In addition, enrolment 100 comprises the creation of a read and write access account in the database 4 for user U. The creation of an account comprises the allocation to the user U of two mutually associated keys having the same functions as those held by devices 1 and 3: a private signature key specific to the user U, and a public signature verification key also specific to the user U.

Typically, the application itself generates the pair of keys of the user U and the public key is communicated in priority to the identity-attesting device 1.

The two keys of the user U are memorised in a memory of the client device 2 as directed by the application.

In the remainder hereof, any datum written in the database 4 at the request of an entity holding an access account to the database 4, is implicitly signed before being written by means of the private key specific to this entity. In addition, any signed datum read in the database 4 by a third party holding an access account to the database 4 is implicitly verified by means of the public key specific to the entity, so as to obtain the datum originally provided by the entity.

At least one random datum associated with the identity element provided by the user U is also generated (step 102).

Figure 2:
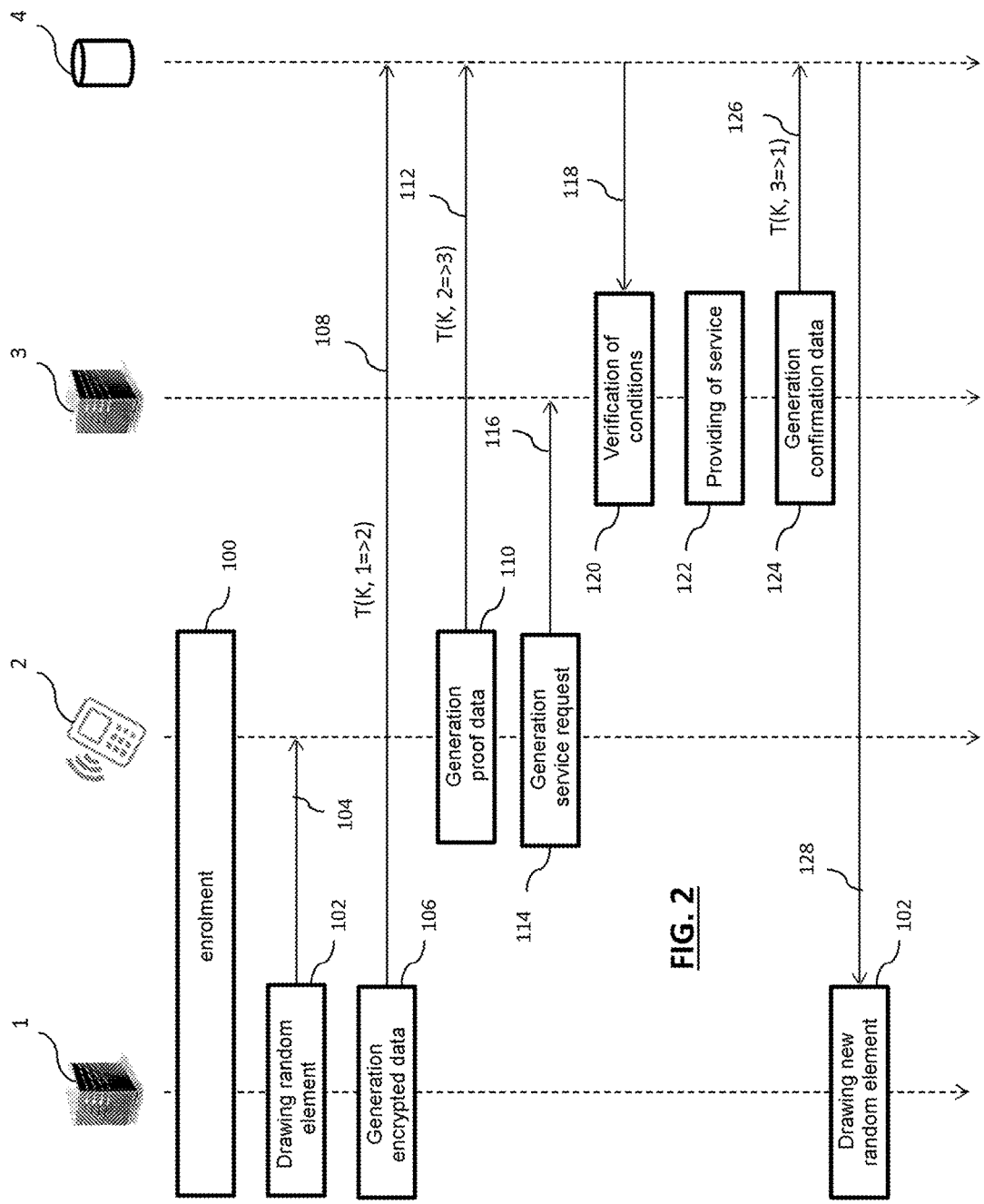
FIG. 2 is a flow chart of steps of a service-providing method implemented by the system illustrated in FIG. 1, according to one embodiment.

This random datum may be generated by the identity-attesting device 1 as illustrated in FIG. 2, in which case the random datum is transmitted from the identity-attesting device 1 to the client device 2 (step 104). Alternatively, the random datum may be generated by the client device 2 (in which case the client device 2 transmits the random datum to the identity-attesting device 1).

In the remainder hereof, $x_0$ designates the random datum, and $x_1$ to $x_n$ are n identity elements supplied to the identity-attesting device 1, n being equal to or higher than 1. All the identity elements $x_1$ to $x_n$ may, for example, be one or other of the identity sets of level 1, 2 or 3 previously defined.

The identity-attesting device 1 generates confidentiality-protected data from at least one identity element and from the random datum (step 106). By "confidentiality-protected" it is meant that the identity element and the random datum do not appear in plaintext in the confidentiality-protected data.

In general, the generation 106 of the confidentiality-protected data may be considered to be the application of a predetermined function H to the identity elements and to the random datum. The confidentiality-protected data may therefore be written: $H(x_0, \ldots, x_n)$.

In the remainder hereof, an embodiment is detailed in which the confidentiality-protected data are hashed data: in other words, the predetermined function H is a hash function. Hash data are also called "imprint" or "hash" in the literature.

The hash function H has several advantages. The value of the result of its application cannot be predetermined. In addition, the H function is difficult to reverse which means that it is practically impossible to trace back to the antecedents of the H function from the hashed data $H(x_0, \ldots, x_n)$, or to find two antecedents having the same image. A particular embodiment of the invention is developed below in which the hashed data are obtained by applying the following formula:

$$H(x_0, \ldots, x_n) = \prod_{i=0}^{n} G_i^{x_i}$$

where the terms $G_i$ are predetermined elements of a finite group, for example points on an elliptical curve or elements of a cyclic group. The terms $G_i$ are also known to the client device 2 and to the identity-controlling device 3.

The identity-attesting device 1 gives instruction for memorisation of the hashed data $H(x_0, \ldots, x_n)$ in the database 4 in a manner that will indicate to any third party that the hashed data have been generated by the identity-attesting device 1 (step 108). This indication materialises the fact that the hashed data have been generated on the basis of a user (here U) authorised by the identity-attesting device 1. As will be seen below, predetermined processing will be performed to the benefit of a user only if this user proves to have been authorised by the identity-attesting device 1. For example, an authorised user may be provided with a service by the identity-controlling device 3 (or a service-providing device separate from the identity-controlling device 3) whilst a non-authorised user will not be able to have access to said service.

When an electronic currency managing system such as Bitcoin® is used, said indication may be obtained by means of a transaction of a certain amount of electronic currency sent from the identity-attesting device 1 to the benefit of the client device 2.

For example, the identity-attesting device 1 generates first transaction data T(K,1=>2) able to indicate that the identity-attesting device 1 is transferring to user U a predetermined amount K of electronic currency, for example K Bitcoins. The user U, the recipient of the transaction, is identified by its public key received when creating its access account in the database 4.

The identity-attesting device 1 then gives instruction for memorisation 108 in the database 4 of the first transaction data and of the hashed data. The first transaction data are placed in association with the public key of the user U in the database 4, so as to indicate to a third party accessing the database 4 that this user U is the recipient of the K Bitcoins transferred by the identity-attesting device 1.

This association, for example, is inclusion of the hashed data $H(x_0, \ldots, x_n)$ in the first transaction data. When the Bitcoin® system is used, the first transaction data comprise an OP_RETURN field that may be used to store the hashed data.

At a later time, the user U wishes to access the service provided by the identity-controlling device 3. For this purpose, the application generates a service request (step 114), and orders the sending of the request generated by the client device 2 of the user U to the identity-controlling device 3, via a channel previously set up between the devices 2 and 3 (step 116).

On receipt of this request, the identity-controlling device 3 read accesses the database 4 and searches for any hashed data previously generated by the identity-attesting device 1 from an identity element of the user U and at least one random datum specific to the user U.

If said hashed data is found in the database 4, the identity-controlling device 3 verifies whether a condition relating to the hashed data is met.

If the condition is met, the identity-controlling device 3 provides the requested service to the client device 2 (step 122). The identity-controlling device 3 has inferred from the hashed data that the requesting user has previously been authorised by the identity-attesting device 1.

If the condition is not met, the identity-controlling device 3 does not provide the requested service to the client device 2. In this case, the service-providing device 3 infers from the absence of hashed data based on an identity element of the requesting user that this requesting user U has not been authorised by the identity-attesting device 1.

For the user U, the service is indeed provided since the hashed data $H(x_0, \ldots, x_n)$ have indeed been generated by the identity-attesting device 1 and then memorised at the request of the latter in the database 4.

In other words, the identity-controlling device 3 only provides a service to a requesting user if this user has been authorised by the identity-attesting device 1. It may be noted that the identity-controlling device 3 did not need to communicate directly with the identity-attesting device 1 to decide whether or not the service is to be provided to the requesting user; it only needed to inspect the content of the database 4. One advantage of this solution is its flexibility of use: the identity-controlling device 3 may take a decision relating to a formulated service request even when the identity-attesting device is not available (switched off, not connected to the network or faulty).

Also, the use of the database 4 of blockchain type allows very simple deployment of the method. The devices 1, 2, 3 only need minimal configuration (in particular the creation of access accounts to the database 4), the security of the method in terms of protection against falsifications being ensured by the database 4. The use of a database of a transaction system such as Bitcoin® or equivalent is particularly easy to implement.

In addition, no identity element has been directly written in plaintext in the database 4. Solely the hashed data are memorised in the database 4. Since the hashed data depend not only on at least one identity element but also on a random datum, it is impossible for a third party—knowing the identity element of the user U—to conclude, via simple access to the database 4 that is public, that the user U has been authorised by the identity-attesting device 1, without also knowing the random datum.

First Embodiment

FIG. 2 illustrates a first embodiment in which the client device 2 detects that the database 4 contains first transaction data indicating that K Bitcoins have been transferred to the user U.

After this detection, the client device 2 generates proof data which are dependent on the identity element of the user U and on the random datum $x_0$ specific to the user U (step 110).

For example, the proof data comprise a first proof datum c and n proof data $f_0, \ldots f_n$, which are calculated as follows:

$$c = h(H(A_0, \ldots, A_n)) = h\left(\prod_{i=0}^{n} G_i^{A_i}\right)$$

where h is a predetermined hash function (for example differing from function H), and $A_0, \ldots, A_n$ are n randomly drawn data; and $$\forall i \in [\![0, n]\!] \quad f_i = A_i + c x_i$$

The client device 2 gives instruction for memorisation in the database 4 of the proof data c, $f_0, \ldots, f_n$ so as to indicate that the proof data were generated by the client device 2 (step 112).

The proof data c, $f_0, \ldots, f_n$ are also associated in the database 4 with the hashed data $H(x_0, \ldots, x_n)$ previously generated by the identity-attesting device 1, so as to indicate that the proof data and the associated hashed data were generated from the same identity elements $x_1, \ldots, x_n$ and from the same random datum $x_0$ (specific to the user U).

When an electronic currency management system such as Bitcoin® is used, said indication may be obtained by means of at least one transaction towards the identity-attesting device 1 covering the amount of electronic currency received by the user U from the identity-attesting device 1. For this purpose, the client device 2 generates second transaction data T(K,2=>3) indicating that the requesting user U transfers to the identity-controlling device 3 the predetermined amount K received from the identity-attesting device 1. The client device 2 gives instruction for memorisation 112 in the database 4 of the second transaction data and of the proof data. The second transaction data are placed in association, in the database 4, with the public key of the identity-controlling device 3, so as to indicate that the identity-controlling device 3 is the recipient of the K Bitcoins transferred by the client device 2.

For example, this association is inclusion of the proof data in the second transaction data. When the Bitcoin® system is used, the second transaction data comprise an OP_RETURN field that may be used to store the proof data.

It may happen that the proof data are too voluminous to be memorised in a single OP_RETURN field. In this case, the client device 2 generates and then gives instruction for memorisation in the database 4 of several second transaction data, the sum of the amounts of the second transaction being equal to K.

The preceding steps 110, 112 are performed before the sending of the service request by the client device 2 to the identity-controlling device 3. For example, the client device 2 sends the service request just after having received confirmation that the second transaction data have been memorised in the database 4.

The service-providing device 3 detects that the database 4 contains the second transaction data indicating that K Bitcoins have been transferred to it by the client device 2.

For example, this detection is implemented by the service-providing device 3 in response to receipt of the service request sent by the client device 2 at step 114.

The identity-controlling device 3 read accesses the database 4 and downloads the proof data associated with the second transaction data whereby it is designated as the recipient of the K Bitcoins (step 118). To do so, all it needs to do is to read the content of the OP_RETURN field of the second transaction data T(K,2=>3).

The identity-controlling device 3, at this stage, therefore has knowledge of the proof data c, $f_0, \ldots, f_n$. In addition, as indicated above, the identity-controlling device 3 also has knowledge of function H. It is also assumed that the identity-controlling device 3 knows function h.

The identity-controlling device 3 verifies whether two conditions are cumulatively met (step 120): a first condition and a second condition.

The first condition to be met is the existence in the database 4 of proof data that have been generated by the client device 2 and that are also associated with data hashed by the identity-attesting device 1.

If the Bitcoin® system is used, the identity-controlling device 3 simply determines the origin of the K bitcoins it has received. If there exists transaction data in the database 4 indicating transfer of the K bitcoins from the identity-attesting device 1 to the client device 2, then the identity-controlling device 3 reads the content of the OP_RETURN field of said transaction data and considers that they are hashed data generated by the identity-attesting device 1.

For user U, the K bitcoins transferred by the client device 2 to the identity-controlling device 3 in the second transaction data T(K,2=>3) had previously been transferred by the identity-attesting device 1 to the client device 2 in the first transaction data T(K,1=>2). The identity-controlling device 3 therefore reads the content of the OP_RETURN field of the first transaction data to obtain the hashed data.

At this stage, the identity-controlling device 3 has knowledge of the proof data but also of the hashed data with which the proof data are associated.

The second condition to be met is that the found hashed data, if any, and the proof data associated with any found hashed data must be related by a predetermined mathematical relation.

The predetermined mathematical relation is the following:

$$h\left(\frac{H(f_0, \ldots, f_n)}{(H(x_0, \ldots, x_n))^c}\right) = c$$

For example, if $H(x_0, \ldots, x_n) = \Pi_{i=0}^{n} G_i^{x_i}$ this predetermined mathematical relation becomes:

$$h\left(\frac{\prod_{i=0}^{n} G_i^{f_i}}{\left(\prod_{i=0}^{n} G_i^{x_i}\right)^c}\right) = c$$

The identity-controlling device 3 provides the service requested by the client device 2 only if the two conditions are cumulatively met (step 122).

If the two conditions are not cumulatively met, the identity-controlling device 3 does not provide the service requested by the client device 2.

One advantage of this first embodiment is that the identity-controlling device 3 is able to determine whether a user U has or has not been authorised by the identity-attesting device 1, without needing to know the values of the terms $x_i$ (identity elements and random datum). The provider device 3 in fact only uses the hashed data and the proof data memorised in the database 4.

Evidently, proof data and mathematical relations other than those given above may be used to determine providing of the service by device 3, for example those described in the document "Rethinking Public Key Infrastructures and Digital Certificates: Building in Privacy", by Stefan Brands.

Second Embodiment

In a second embodiment, not illustrated, that is easier to implement than the first embodiment, the values of the terms $x_i$ (identity elements and random datum) are supplied to the identity-controlling device 3 by the requesting user U. For example, the values of the terms $x_i$ are transmitted by the client device 2 to the identity-controlling device 3.

The identity-controlling device 3 generates hashed data from the identity element of the requesting user U and from the random datum specific to the requesting user U, that it has therefore received. For this purpose, device 3 uses the function H of which it has knowledge.

The identity-controlling device 3 read accesses the database 4 and verifies whether the database 4 contains hashed data that are indicated both as having been generated by the identity-attesting device 1 and are the same as the hashed data generated by the identity-controlling device 3.

If such is the case, the identity-controlling device 3 provides the service requested at step 122. Otherwise the identity-controlling device 3 refuses the service request.

Steps Following after Provision of the Service

After the service has been provided to the requesting user U by the identity-controlling device 3 at step 122, the identity-controlling device 3 generates confirmation data indicating that the service has been provided to the requesting user U (step 124).

These confirmation data are memorised in the database 4 on instruction given by the identity-controlling device 3 (step 126).

When an electronic currency management system such as Bitcoin® is used, the confirmation data generated by the identity-controlling device 3 are associated in the database 4 with third transaction data T(K,3=>1) indicating that the identity-controlling 3 has transferred the amount K received from the client device 2 to the identity-attesting device 1.

Therefore, the identity-attesting device 1 is credited with the amount K that it had previously spent.

The third transaction data are generated by the identity-controlling device 3 and are similar to the first and second transaction data. When the Bitcoin® system is used, the third transaction data comprise an OP_RETURN field that may be used to store the confirmation data.

The identity-attesting device 1 may therefore be informed of the fact that the identity-controlling device 3 has provided a service to user U that it previously authorised, without having to communicate directly with the identity-controlling device 3 since it is sufficient for the identity-attesting device 1 to read (step 128) the confirmation data contained in the database 4 that are associated with the third transaction data, and to decrypt the signed confirmation data by means of a public key specific to the identity-controlling device 3.

Preferably, the random datum is one-off. Therefore, even if a malevolent third party should learn the random element specific to user U, such party could not make use thereof several times with the identity-controlling device 3.

For example, after the service has been provided to user U by the identity-controlling device 3, the identity-attesting device 1 randomly draws a new random datum specific to the user U (step 102), and then generates new hashed data from the identity element of the requesting user U and from the new random datum (step 106), and gives instruction for memorisation of the new hashed data in the database 4 so that any new implementation of the proof establishing step uses the new hashed data instead of the previously hashed data.

Provision may also be made so as to allocate to the user U a new pair of public and private keys after the service has been provided to the user U by the identity-controlling device 3. The new pair of keys may be generated by the application executed by the client device 2 on request sent by the identity-attesting device 1, or else generated by the identity-attesting device 1 and then transmitted by the latter to the client device 2 via network R.

As previously indicated, the client device 2 is intended to be operated by the user U. In the event of theft of the client device 2, a non-authorised user U could attempt to gain access to the service provided by device 3, by masquerading as the true owner of the client device 2. It is therefore advantageous to memorise revocation data in the database 4 indicating that the requesting user U has been revoked by the identity-attesting device 1. This memorisation is typically ordered by the identity-attesting device 1.

Therefore, the service will be provided by the identity-controlling device 3 only if the identity-controlling device 3 device does not find revocation data in the database 4 indicating that the private key of the requesting user U has been revoked by the identity-attesting device 1.

The revocation data are memorised for example in the database 4 in the same format as the hashed data. If the Bitcoin® system is used, the identity-attesting device 1 generates fourth transaction data indicating which transfer of K bitcoins to the user is to be revoked (here U). The OP_RETURN field of the fourth transaction data contains the revocation data. The revocation data are a chain of predetermined characters, for example "REVOKED". As previously indicated, the identity-controlling device 3 reads the hashed data in the database 4 before providing the service requested by the requesting user U.

In addition to the conditions set forth for the first embodiment and second embodiment described above, the identity-controlling device 3 verifies whether the data contained in the OP_RETURN field of the transaction data, in which it receives the transfer of K bitcoins, does or does not contain revocation data. In the affirmative the service is not provided.

The above-described method is evidently not limited to a database 4 for a Bitcoin® system.

The method is evidently applicable to any type of predetermined processing whether or not to be carried out as a function of the identity of the requesting user U, and whether by the identity-controlling device 3 itself or by another device with which the identity-controlling device 3 communicates.

The method finds advantageous application with a view to increasing the repute of a user authorised by the identity-attesting device 1, with third parties.

All the access accounts to the database 4 are anonymous in that the true identities of the holders of the access accounts to the database 4 are not known to third parties on mere reading of the content of the database 4. A third party reading the transaction data T(K,1=>2), T(K,2=>3) and T(K,3=>1) will find that K bitcoins are successively owned by a first account, then by a second account and a third account. To read these transaction data, any third party may use the public key associated with each of these accounts. However, the third party does not know the identity of the holder of each of these three accounts. In particular, the third party absolutely does not know that the user U is one of these holders.

However, the user U may wish to reveal its ownership of an account to a third party, for the purpose of increased repute, for example with a bank.

Additionally, the user U may be the holder of different accounts. For example, user U may be the holder of a first account used to implement the preceding method involving the devices 1 and 3, and holder of a second account used to implement the same method but involving an identity-attesting device differing from device 1 and a service-providing device differing from device 3. In this case, the user U may disclose to a third party with which it wishes to increase its repute, only that it is the holder of one of the first and second accounts, in which case only fragmented information is given to such third party. Alternatively, the user may disclose that it is the holder of the first and second accounts.

Also, it was previously seen that the devices 1, 2, and 3 each have an access account to the database 4. In particular, provision is made in the embodiment illustrated in FIG. 2 for a user U to be able to access the content of the database 4 via an account that it has created on its own initiative through the client device 2.

In another embodiment, the devices 1 and 3 each have said access account, but no access account to the public database 4 needs to be created by the user U. In this embodiment, the identity-attesting device makes a transaction towards a predetermined third-party account specially created for the user U by the identity-attesting device 1, or else towards itself.

The identity-attesting device 1 then transmits a message to the client device 2, via a secure channel, containing locating data to allow the locating in the public database 4 of the confidentiality-protected data memorised therein on instruction given by the identity-attesting device 1. These locating data may be a reference for the transaction operated by device 1, for example an ID blockchain. These locating data may then be transmitted by the client device 2 to the identity-controlling device 3 to enable the identity-controlling device 3 to locate the confidentiality-protected data previously memorised on instruction given by the identity-attesting device 1.

The invention claimed is:

1. A method for controlling the identity of a user, comprising the following steps implemented by an identity-controlling device:
reading, in a public database of blockchain type confidentiality-protected data if any previously generated by an identity-attesting device from an identity element of a user (U) and at least one random datum specific to the user);
verifying heed of a condition relating to the confidentiality-protected data found in the public database;
performing predetermined processing for the user only if the condition is heeded,
wherein the confidentiality-protected data generated by the identity-attesting device are associated in the public database with first transaction data indicating that the identity-attesting device has transferred a predetermined amount of electronic currency to a recipient;
wherein the confidentiality-protected data are obtained by applying the formula:

$$\prod_{i=0}^{n} G_i^{x_i}$$

where:
n is an integer equal to or higher than 2;
at least one of $x_i$ is a random datum specific to the user (U), and each other $x_i$ is an identity element of the user (U);
$G_i$ are predetermined elements of a finite group.

2. The method according to claim 1, further comprising steps of:
obtaining, by the identity-controlling device, second confidentiality-protected data dependent on the identity element and on the random datum, wherein the second confidentiality-protected data are received from a client device belonging to the user or are generated by the identity-controlling device from the identity element and the random datum;
performing the predetermined processing only if the identity-controlling device finds confidentiality-protected data in the public database, that are generated by the identity-attesting device and are the same as the second confidentiality-protected data obtained.

3. The method according to claim 1, comprising steps of:
obtaining proof data, by the identity-controlling device, wherein the proof data has been previously generated by a client device belonging to the user from the identity element of the user and from the random datum specific to the user;
performing the predetermined processing only if the found confidentiality-protected data and the proof data are related by a predetermined mathematical relation.

4. The method according to claim 3, wherein the proof data are received by the identity-controlling device via a secure channel set up directly between the client device and the identity-controlling device.

5. The method according to claim 3, wherein:
the proof data are obtained by reading the proof data in the public database;
the predetermined processing is performed only if the following conditions are met:
the read proof data are associated, in the public database, with the confidentiality-protected data previously generated by the identity-attesting device,
the found confidentiality-protected data and the proof data associated with the found confidentiality-protected data are related by a predetermined mathematical relation.

6. A method for controlling the identity of a user (U), comprising the following steps implemented by an identity-controlling device:
reading, in a public database of blockchain type, confidentiality-protected data if any previously generated by an identity-attesting device from an identity element of a user (U) and at least one random datum specific to the user (U), wherein the confidentiality-protected data generated by the identity-attesting device are associated in the public database with first transaction data indicating that the identity-attesting device has transferred a predetermined amount of electronic currency to a recipient;
obtaining proof data previously generated by a client device belonging to the user (U) from the identity element of the user (U) and from the random datum specific to the user (U);
performing predetermined processing for the user (U) only if the found confidentiality-protected data and the proof data are related by a predetermined mathematical relation;
wherein the confidentiality-protected data were generated by applying a predetermined hash function H to data $x_0, \ldots, x_n$, where:
n is an integer equal to or higher than 2;
at least one of $x_i$ is a random datum specific to the user, and each other $x_i$ is an identity element of the user;
and wherein the proof data comprise:
a datum c calculated by the formula: $c=h(H(A_0, \ldots, A_n))$
where h is a predetermined function, and $A_0, \ldots, A_n$ are n randomly drawn data,
n proof data $f_0, \ldots, f_n$ calculated by applying formulas:
$$\forall i \in [[0,n]] f_i = A_i + c x_i$$
wherein the predetermined mathematical relation is:

$$h\left(\frac{H(f_0, \ldots, f_n)}{(H(x_0, \ldots, x_n))^c}\right) = c.$$

7. The method according to claim 3, wherein:
the recipient is the user,
the proof data are associated in the public database with second transaction data indicating that the user has transferred to the identity-controlling device the predetermined amount received from the identity-attesting device.

8. The method according to claim 1, wherein the predetermined processing is, comprises or triggers a predetermined service to be provided to the user, and wherein the method further comprises generating and storing, in the public database, confirmation data indicating that the service has been provided to the user.

9. The method according to claim 7 taken in combination, wherein the generated confirmation data are associated in the public database with third transaction data indicating that a service-providing device, having provided the service to the user, has transferred the predetermined amount to the identity-attesting device.

10. The method according to claim 1, further comprising steps of:
after the predetermined processing has been performed by the identity-controlling device, generating, by the identity-attesting device, new confidentiality-protected data from the identity element of the user and at least one new random datum specific to the user,
storing the new confidentiality-protected data in the public database so that new implementation of the verification step uses the new confidentiality-protected data instead of the confidentiality-protected data.

11. The method according to claim 1, wherein
each $G_i$ is a points on an elliptical curve or an element of a cyclic group.

12. The method according to claim 1, wherein the predetermined processing is performed by the identity-controlling device only if the identity-controlling device does not find in the public database revocation data indicating that a private key of the user has been revoked by the identity-attesting device.

13. A non-transitory computer-readable medium comprising code instructions for causing at least one processor to perform the method as claimed in claim 1.

14. An identity-controlling device to control the identity of a user, wherein the identity-controlling device comprises a communication interface with a public database of blockchain type and at least one processor configured to:
give instruction for the reading in the public database of confidentiality-protected data, if any, previously generated by an identity-attesting device from an identity element of the user and at least one random datum specific to the user;
verify heed of a condition relating to the found confidentiality-protected data;
perform predetermined processing for the user only if the condition is heeded,
wherein the confidentiality-protected data generated by the identity-attesting device are associated in the public database with first transaction data indicating that the identity-attesting device has transferred a predetermined amount of electronic currency to a recipient;
wherein the confidentiality-protected data are obtained by applying the formula:

$$\prod_{i=0}^{n} G_i^{x_i}$$

where:
n is an integer equal to or higher than 2;
at least one of $x_i$ is a random datum specific to the user (U), and each other $x_i$ is an identity element of the user (U),
$G_i$ are predetermined elements of a finite group.

15. A client device intended to belong to a user, wherein the client device comprises:
a communication interface with a public database of blockchain type;
at least one processor configured to:
generate proof data from an identity element of the user and at least one random datum specific to the user,
give instruction for storing, in the public database, of the proof data so as to indicate that the proof data were generated by the client device, and in association with confidentiality-protected data previously generated by an identity-attesting device from one same identity element and one same random datum;
perform the predetermined processing only if the found confidentiality-protected data and the proof data are related by a predetermined mathematical relation,
wherein the confidentiality-protected data generated by the identity-attesting device are associated in the public database with first transaction data indicating that the identity-attesting device has transferred a predetermined amount of electronic currency to a recipient,
wherein the confidentiality-protected data are obtained by applying the formula:

$$\prod_{i=0}^{n} G_i^{x_i}$$

where:
n is an integer equal to or higher than 2;
at least one of $x_i$ is a random datum specific to the user (U), and each other $x_i$ is an identity element of the user (U);
$G_i$ are predetermined elements of a finite group.

16. A method for controlling the identity of a user (U), comprising the following steps implemented by an identity-controlling device:
reading, in a public database of blockchain type, confidentiality-protected data if any previously generated by an identity-attesting device from an identity element of a user (U) and at least one random datum specific to the user (U), wherein the confidentiality-protected data generated by the identity-attesting device are associated in the public database with first transaction data indicating that the identity-attesting device has transferred a predetermined amount of electronic currency to a recipient;
obtaining proof data previously generated by a client device belonging to the user (U) from the identity element of the user (U) and from the random datum specific to the user (U);
verifying heed of a condition relating to the confidentiality-protected data found in the public database;
performing predetermined processing for the user (U) only if the found confidentiality-protected data and the proof data are related by a predetermined mathematical relation.

* * * * *